US012374256B2

(12) United States Patent
Lee et al.

(10) Patent No.: US 12,374,256 B2
(45) Date of Patent: Jul. 29, 2025

(54) METHOD OF CORRECTING GAMMA AND DISPLAY DEVICE EMPLOYING THE SAME

(71) Applicant: Samsung Display Co., Ltd., Yongin-si (KR)

(72) Inventors: Kanghee Lee, Yongin-si (KR); Hyeonmin Kim, Gwacheon-si (KR); Jungyu Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/861,644

(22) Filed: Jul. 11, 2022

(65) Prior Publication Data

US 2023/0075995 A1 Mar. 9, 2023

(30) Foreign Application Priority Data

Sep. 6, 2021 (KR) ........................ 10-2021-0118235

(51) Int. Cl.

| | |
|---|---|
| ***G09G 3/20*** | (2006.01) |
| ***G09G 3/00*** | (2006.01) |
| ***G09G 3/3233*** | (2016.01) |

(52) U.S. Cl.

CPC ........... *G09G 3/2007* (2013.01); *G09G 3/006* (2013.01); *G09G 3/3233* (2013.01); *G09G 2300/0819* (2013.01); *G09G 2300/0842* (2013.01); *G09G 2320/0276* (2013.01); *G09G 2320/0626* (2013.01); *G09G 2320/0666* (2013.01); *G09G 2330/021* (2013.01); *G09G 2360/16* (2013.01)

(58) Field of Classification Search

None

See application file for complete search history.

(56) References Cited

U.S. PATENT DOCUMENTS

| | | | | |
|---|---|---|---|---|
| 7,233,305 | B1 * | 6/2007 | Orlando | G09G 3/3696 348/674 |
| 11,037,494 | B1 * | 6/2021 | Chang | G09G 3/22 |
| 2019/0304403 | A1 | 10/2019 | Hyun | |
| 2020/0027388 | A1 | 1/2020 | Iwaki et al. | |
| 2020/0098304 | A1 * | 3/2020 | Hou | G06V 10/56 |
| 2020/0335042 | A1 | 10/2020 | Son et al. | |
| 2021/0097920 | A1 * | 4/2021 | Yu | G09G 3/2007 |
| 2021/0118408 | A1 * | 4/2021 | Kurokawa | G09G 3/2092 |
| 2021/0243346 | A1 * | 8/2021 | Bhatia | G09G 5/10 |
| 2021/0287089 | A1 * | 9/2021 | Mayer | G06N 3/04 |
| 2021/0295172 | A1 * | 9/2021 | Sultan | G06N 3/047 |
| 2022/0067911 | A1 * | 3/2022 | Narasimhan | G06T 7/0004 |

(Continued)

FOREIGN PATENT DOCUMENTS

| | | | |
|---|---|---|---|
| CN | 107346653 | A | 11/2017 |
| KR | 1020190074847 | A | 6/2019 |

(Continued)

*Primary Examiner* — Benjamin C Lee
*Assistant Examiner* — Emily J Frank
(74) *Attorney, Agent, or Firm* — CANTOR COLBURN LLP

(57) ABSTRACT

A method of correcting gamma includes generating a representative panel model by performing a deep learning based on luminance factors and a representative display panel, generating a panel model by performing a transfer learning based on the representative panel model and a display panel, and determining a grayscale voltage for the display panel based on the panel model.

20 Claims, 12 Drawing Sheets

(56) References Cited

U.S. PATENT DOCUMENTS

| | | | | |
|---|---|---|---|---|
| 2022/0301470 | A1 * | 9/2022 | Cao | G09G 3/006 |
| 2022/0358877 | A1 * | 11/2022 | Hack | G06V 10/82 |
| 2023/0015253 | A1 * | 1/2023 | Nie | G06V 10/82 |
| 2023/0067287 | A1 * | 3/2023 | Akimoto | G09G 3/36 |

FOREIGN PATENT DOCUMENTS

| | | | | |
|---|---|---|---|---|
| KR | 1020190116599 | A | 10/2019 | |
| KR | 1020190133695 | A | 12/2019 | |
| KR | 1020210004007 | A | 1/2021 | |
| WO | WO-2020126122 | A1 * | 6/2020 | A61N 5/103 |

* cited by examiner

METHOD OF CORRECTING GAMMA AND DISPLAY DEVICE EMPLOYING THE SAME

This application claims priority to Korean Patent Application No. 10-2021-0118235, filed on Sep. 6, 2021, and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a method of correcting gamma and a display device employing the method of correcting gamma.

2. Description of the Related Art

In a display device, a gamma correction may be performed for the display device to have a specific gamma characteristic to match a image quality of the display device to a target image quality. The gamma characteristic may indicate a correlation between a grayscale level and luminance.

SUMMARY

In a display device where a gamma correction is performed, a grayscale voltage corresponding to a grayscale level may be predetermined in order for the display device to have a specific gamma characteristic. However, since luminance is also affected by other factors, the gamma characteristic may be changed by other factors.

Embodiments of the invention provide a method of correcting gamma by which a gamma correction is performed based on a deep learning.

In a display device, a gamma correction may be performed for the display device to have a specific gamma characteristic to match a image quality of the display device to a target image quality. The gamma characteristic may indicate a correlation between a grayscale level and luminance.

SUMMARY

In a display device where a gamma correction is performed, a grayscale voltage corresponding to a grayscale level may be predetermined in order for the display device to have a specific gamma characteristic. However, since luminance is also affected by other factors, the gamma characteristic may be changed by other factors.

Embodiments of the invention provide a method of correcting gamma by which a gamma correction is performed based on a deep learning.

Embodiments of the invention also provide a display device that performs a gamma correction based on a deep learning.

According to embodiments of the invention, a method of correcting gamma includes generating a representative panel model by performing a deep learning based on luminance factors and a representative display panel, generating a panel model by performing a transfer learning based on the representative panel model and a display panel, and determining a grayscale voltage for the display panel based on the panel model.

In an embodiment, the luminance factors may include a grayscale level, and the luminance factors may further include at least one selected from a frame frequency, an on-duty ratio, a power supply voltage, and an initialization voltage.

In an embodiment, the method may further include storing information on the grayscale voltage.

In an embodiment, the method may further include determining tuning points of luminance and color coordinate based on the luminance factors, determining a target luminance and a target color coordinate at each of the tuning points, and measuring a first test voltage applied to pixels included in the representative display panel corresponding to the target luminance and the target color coordinate at the tuning points. The deep learning may be performed based on the tuning points, the target luminance, the target color coordinate, and the first test voltage.

In an embodiment, the deep learning may use the tuning points, the target luminance, and the target color coordinate as input values, and the deep learning may use the first test voltage as a target value.

In an embodiment, the determining the tuning points may include determining reference values of the respective luminance factors, and determining the tuning points based on the reference values.

In an embodiment, a number of the tuning points may be a product of respective numbers of the reference values of the respective luminance factors.

In an embodiment, the method may further include measuring a second test voltage applied to pixels included in the display panel corresponding to the target luminance and the target color coordinate at a some of the tuning points. In such an embodiment, the transfer learning may be performed based on the some of the tuning points, the target luminance at the some of the tuning points, the target color coordinate at the some of the tuning points, the second test voltage, and the representative panel model.

In an embodiment, the panel model may be generated in a cell process, and the representative panel model may be generated before the cell process.

According to embodiments of the invention, a method of correcting gamma includes generating a representative panel model by performing a deep learning based on luminance factors and a representative display panel, generating a panel model by performing a transfer learning based on the representative panel model and a display panel, storing weights of the panel model, generating a re-implemented panel model by re-implementing the panel model based on the weights of the panel model, and determining a grayscale voltage for the display panel based on the re-implemented panel model.

In an embodiment, the luminance factors may include a grayscale level, and the luminance factors may further include at least one selected from a frame frequency, an on-duty ratio, a power supply voltage, and an initialization voltage.

In an embodiment, the method may further include determining tuning points of luminance and color coordinate based on the luminance factors, determining a target luminance and a target color coordinate at each of the tuning points, and measuring a first test voltage applied to pixels included in the representative display panel corresponding to the target luminance and the target color coordinate at the tuning points. In such an embodiment, the deep learning may be performed based on the tuning points, the target luminance, the target color coordinate, and the first test voltage.

In an embodiment, the deep learning may use the tuning points, the target luminance, and the target color coordinate as input values, and the deep learning may use the first test voltage as a target value.

In an embodiment, the determining the tuning points may include determining reference values of the respective luminance factors, and determining the tuning points based on the reference values.

In an embodiment, a number of the tuning points may be a product of respective numbers of the reference values of the respective luminance factors.

In an embodiment, the method may further include measuring a second test voltage applied to pixels included in the display panel corresponding to the target luminance and the target color coordinate at a some of the tuning points. In such an embodiment, the transfer learning may be performed based on the some of the tuning points, the target luminance at the some of the tuning points, the target color coordinate at the some of the tuning points, the second test voltage, and the representative panel model.

In an embodiment, the panel model may be generated in a cell process, and the representative panel model may be generated before the cell process.

In an embodiment, the re-implemented panel model may be generated during driving of the display panel.

According to embodiments of the invention, a display device includes a display panel including pixels, a gate driver which applies gate signals to the pixels, a data driver which applies data voltages to the pixels, a driving controller which controls the gate driver and the data driver, and a memory device which stores weights of the panel model. In such an embodiment, the driving controller receives the weights of the panel model from the memory device, generates a re-implemented panel model by re-implementing the panel model based on the weights of the panel model, and determines a grayscale voltage based on the re-implemented panel model. In such an embodiment, the panel model is a model generated by performing a transfer learning in a cell process to match a representative panel model to characteristics of the display panel. In such an embodiment, the re-implemented panel model outputs the grayscale voltage when luminance factors are input.

In an embodiment, the luminance factors may include a grayscale level, and the luminance factors may further include at least one selected from a frame frequency, an on-duty ratio, a power supply voltage, and an initialization voltage.

In embodiments of the invention, the method of correcting gamma may reduce the amount of data used to generate a panel model for a gamma correction by performing a transfer learning.

In such embodiments, the method of correcting gamma may maintain a gamma characteristic even when luminance factors are changed by using a representative panel model generated by performing a deep learning based on the luminance factors.

In such embodiments, the display device may reduce the amount of data stored in a memory device by storing weights of a panel model.

DETAILED DESCRIPTION

Figure 1:
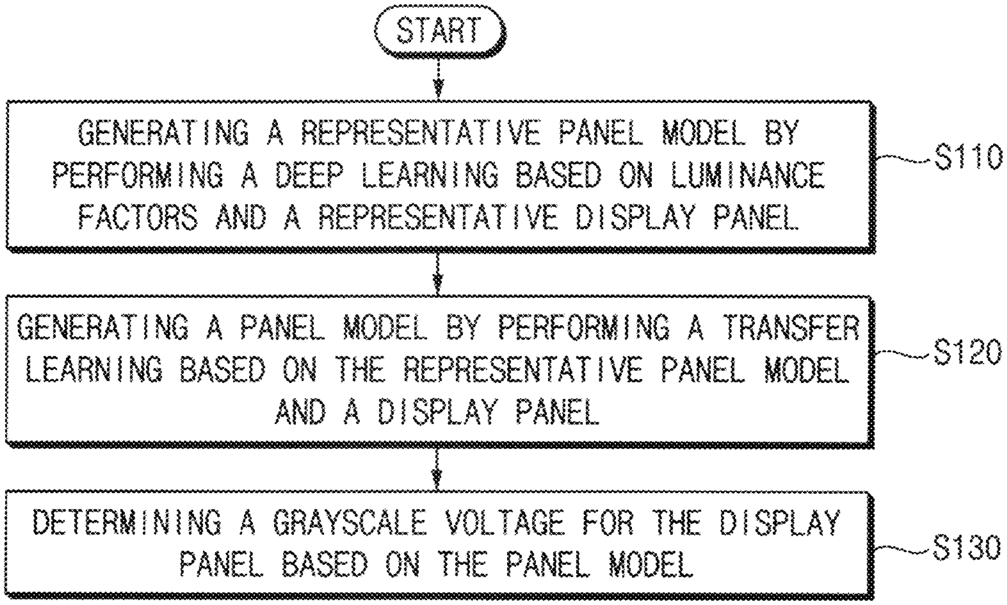
FIG. 1 is a flowchart illustrating a method of correcting gamma according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
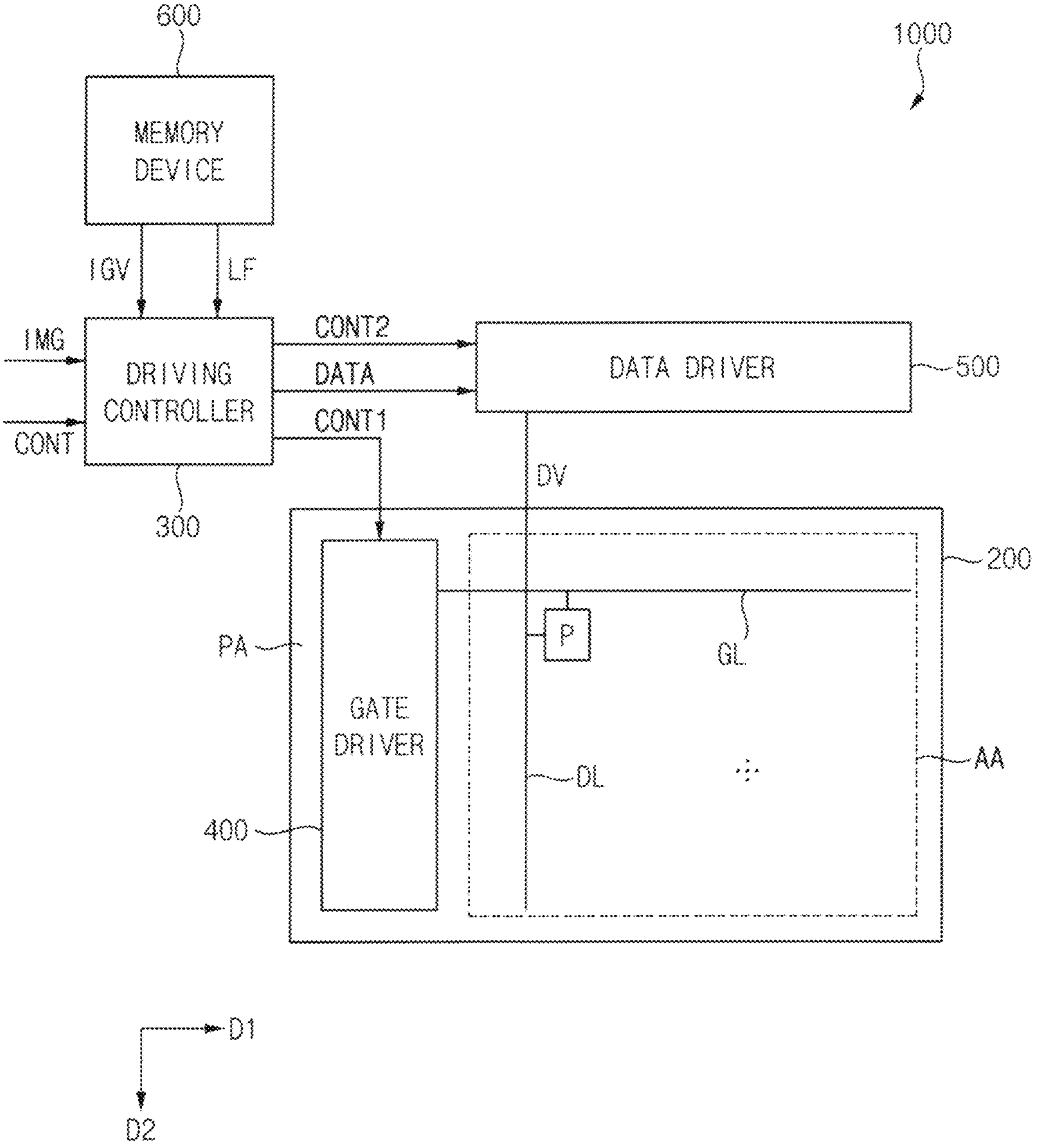
FIG. 2 is a block diagram illustrating an embodiment of a display device employing the method of FIG. 1.
Figure 3:
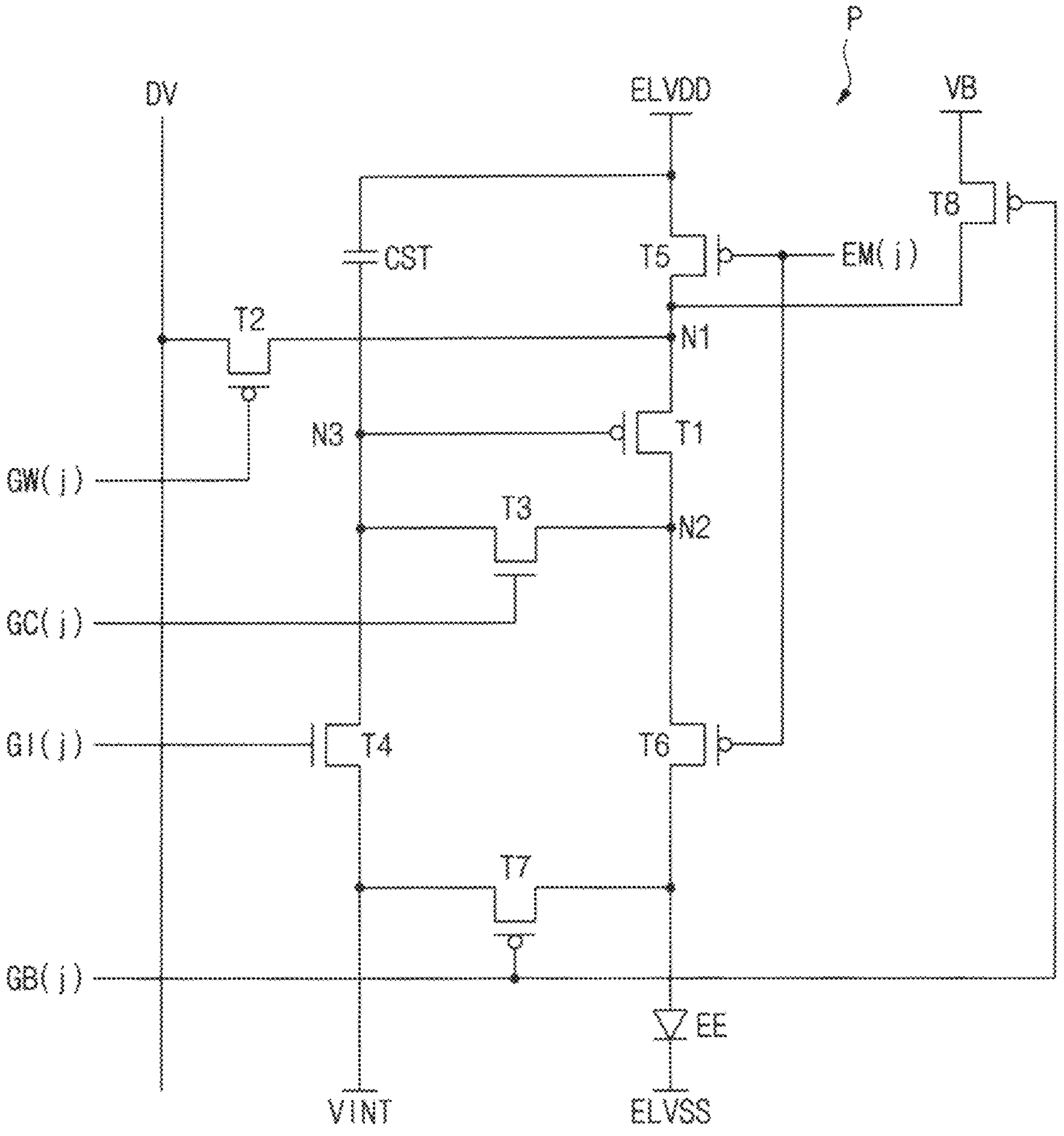
FIG. 3 is a circuit diagram illustrating an embodiment of a pixel included in the display device of FIG. 2.
Figure 4:
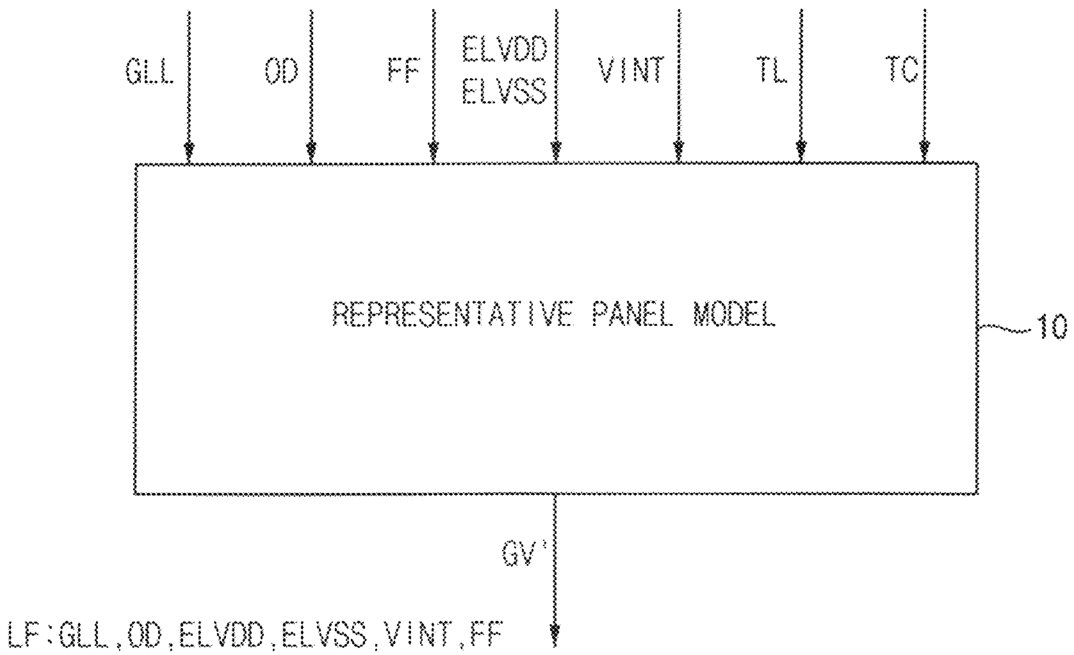
FIG. 4 is a diagram illustrating a representative panel model used in the method of FIG. 1.
Figure 5:
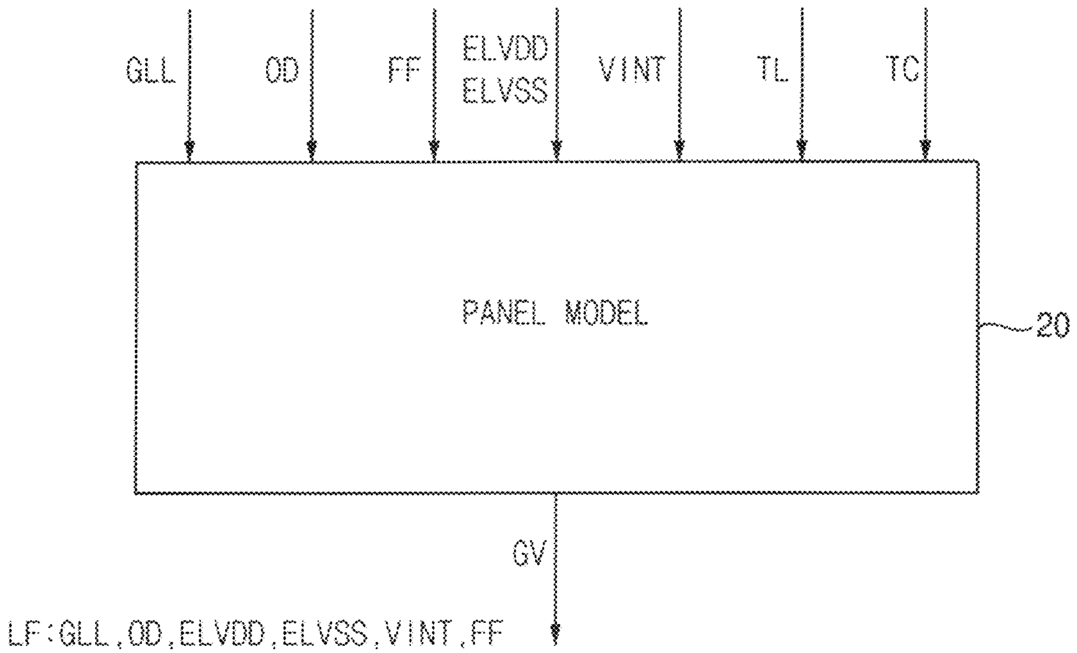
FIG. 5 is a diagram illustrating a panel model used in the method of FIG. 1.

FIG. 1 is a flowchart illustrating a method of correcting gamma according to embodiments of the invention, FIG. 2 is a block diagram illustrating an example of a display device 1000 employing the method of FIG. 1, FIG. 3 is a circuit diagram illustrating an example of a pixel P included in the display device 1000 of FIG. 2, FIG. 4 is a diagram illustrating a representative panel model 10 used in the method of FIG. 1, and FIG. 5 is a diagram illustrating a panel model 20 used in the method of FIG. 1. FIGS. 4 and 5 illustrates that luminance factors LF include a grayscale level GLL, a frame frequency FF, an on-duty ratio OD, power voltages ELVDD and ELVSS, and an initialization voltage VINT.

FIG. 1 is a block diagram illustrating a display device 1000 according to embodiments of the invention.

Referring to FIGS. 1 to 3, an embodiment of the display device 1000 may include a display panel 200, a driving controller 300, a gate driver 400, a data driver 500, and memory device 600. In an embodiment, the driving controller 300 and the data driver 500 may be integrated into a single chip.

The display panel 200 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1. The display panel 200 may include or be divided into an active area AA and a peripheral area PA.

The driving controller 300 may receive input image data IMG and an input control signal CONT from an external device (e.g., a graphic processing unit; GPU). In an embodiment, for example, the input image data IMG may include red image data, green image data, and blue image data. According to an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 300 may generate a first control signal CONT1, a second control signal CONT2, and a data signal DATA based on the input image data IMG, information IGV on a grayscale voltage, and the input control signal CONT.

The driving controller 300 may generate the first control signal CONT1 for controlling operation of the gate driver 400 based on the input control signal CONT and output the first control signal CONT1 to the gate driver 400. The first control signal CONT1 may include a vertical start signal and a gate clock signal.

The driving controller 300 may generate the second control signal CONT2 for controlling operation of the data driver 500 based on the input control signal CONT and output the second control signal CONT2 to the data driver 500. The second control signal CONT2 may include a horizontal start signal and a load signal.

The driving controller 300 may receive the input image data IMG and the information IGV on the grayscale voltage and generate the data signal DATA based on the input image data IMG and the information IGV on the grayscale voltage. The driving controller 300 may output the data signal DATA to the data driver 500.

The gate driver 400 may generate gate signals GW(j), GC(j), GI(j), and GB(j) for driving the gate lines GL in response to the first control signal CONT1 input from the driving controller 300. According to an embodiment, the gate driver 400 may generate the gate signals GW(j), GC(j), GI(j), and GB(j) and emission signals EM(j) for driving the gate lines GL in response to the first control signal CONT1 input from the driving controller 300. The gate driver 400 may output the gate signals GW(j), GC(j), GI(j), and GB(j) to the gate lines GL. In an embodiment, for example, the gate driver 400 may sequentially output the gate signals to the gate lines GL.

The data driver 500 may receive the second control signal CONT2 and the data signal DATA from the driving controller 300. The data driver 500 may convert the data signal DATA into a data voltage DV of an analog type. The data driver 500 may output the data voltage DV to the data lines DL.

The memory device 600 may store the information IGV on the grayscale voltage GV. The information IGV on the grayscale voltage GV may store the grayscale voltage GV corresponding to the luminance factors LF. The memory device 600 may receive the luminance factors LF and apply the information IGV on the grayscale voltage corresponding to the luminance factors LF to the driving controller 300.

In an embodiment, the pixel P may include a light emitting element EE and a plurality of transistors T1 to T8.

A first electrode of the light emitting element EE may be connected to a sixth transistor T6, and a second electrode thereof may be connected to a second power voltage ELVSS. The light emitting element EE may include an organic light emitting diode or an inorganic light emitting diode. The light emitting element EE may generate light in response to a driving current applied thereto from a first transistor T1.

The first transistor T1 may be coupled between a first node N1 electrically connected to a first power voltage ELVDD and a second node N2 electrically connected to the first electrode of the light emitting device EE. The first transistor T1 may generate the driving current and provide the driving current to the light emitting element EE. A gate electrode of the first transistor T1 may be coupled to a third node N3. The first transistor T1 functions as a driving transistor of the pixel P.

A second transistor T2 may be coupled between the data line DL and the first node N1. The second transistor T2 may include a gate electrode that receives a write gate signal GW(j).

The third transistor T3 may be coupled between the second node N2 and the third node N3. The third transistor T3 may include a gate electrode that receives a compensation gate signal GC(j). When the third transistor T3 is turned on, the first transistor T1 may be connected in the form of a diode. That is, the third transistor T3 may serve to write the data voltage DV for the first transistor T1 and perform threshold voltage compensation.

The storage capacitor CST may be connected between the first power voltage ELVDD and the third node N3. The storage capacitor CST may store the data voltage DV and a threshold voltage of the first transistor T1.

A fourth transistor T4 may be coupled between the third node N3 and an initialization voltage VINT. The fourth transistor T4 may include a gate electrode that receives an initialization gate signal GI(j). In an embodiment, the initialization gate signal GI(j) may correspond to a compensation gate signal GC(j−1) of a previous pixel row. When the fourth transistor T4 is turned on, a gate voltage of the first transistor T1 may be initialized to a voltage of the initialization voltage VINT. In an embodiment, the initialization voltage VINT may be set to a voltage lower than the lowest voltage of the data voltage.

A fifth transistor T5 may be coupled between the first power voltage ELVDD and the first node N1. The fifth transistor T5 may include a gate electrode that receives the emission signal EM(j).

A sixth transistor T6 may be coupled between the second node N2 and the first electrode of the light emitting element EE. The sixth transistor T6 may include a gate electrode that receives a light emission signal EM(j).

A seventh transistor T7 may be coupled between the initialization voltage VINT and the first electrode of the light emitting element EE. The seventh transistor T7 may include a gate electrode that receives a bypass gate signal GB(j). In an embodiment, the bypass gate signal GB(j) may correspond to the write gate signal GW(j). However, this is an example, and the bypass gate signal GB(j) may be correspond to the write gate signal GW(j−1) applied to the previous pixel row or the write gate signal GW(j+1) supplied to a next pixel row.

A eighth transistor T8 may be coupled between a bias voltage VB and the first node N1. The eighth transistor T8 may include a gate electrode that receives the bypass gate signal GB(j).

However, for convenience of description, the write gate signal GW(j), the compensation gate signal GC(j), the initialization gate signal GI(j), and the bypass gate signal GB(j) are merely labeled for distinguishing the gate signals provided to different components in the pixel P, and does not limit the functions of each of the gate signals GW(j), GC(j), GI(j), and GB(j).

In an embodiment, each of the first, second, fifth, sixth, seventh, and eighth transistors T1, T2, T5, T6, T7, and T8 m P-type low-temperature poly-silicon ("LTPS") transistors. Each of the third and fourth transistors T3 and T4 may be N-type oxide semiconductor thin film transistors. Since the N-type oxide semiconductor thin film transistor has better current leakage characteristic than the P-type LTPS thin film transistor, the third and fourth transistors T3 and T4 may include or be formed of the N-type oxide semiconductor thin film transistor. Accordingly, since leakage currents in the third and fourth transistors T3 and T4 are substantially reduced, power consumption may be reduced.

An embodiment of the method of correcting gamma, as shown in FIG. 1, may include generating a representative panel model by performing a deep learning based on luminance factors LF and a representative display panel 10 (S110), generating a panel model 20 by performing a transfer learning based on the representative panel model 10 and the display panel 200 (S120), and determining a grayscale voltage GV for the display panel 200 based on the panel model 20 (S130). According to an embodiment, the method of FIG. 1 may include storing information IGV on the grayscale voltage. In an embodiment, for example, the panel model 20 may be generated in a cell process, and the representative panel model 10 may be generated before the cell process. Accordingly, the representative panel model 10 may be generated in advance before the display panel 200 is mass-produced, and the panel model 20 may be generated based on the representative panel model 10 in the process of mass-producing the display panel 200.

In an embodiment, the method of FIG. 1 may include generating a representative panel model by performing the deep learning based on luminance factors LF and a representative display panel 10 (S110). The luminance factors LF may be factors that affect the luminance of the display panel 200. In an embodiment, for example, the luminance factors may include the grayscale level GLL and further include at least one selected from the frame frequency FF, the on-duty ratio OD, the power voltages ELVDD and ELVSS, and the initialization voltage VINT. According to an embodiment, the luminance factors may include the grayscale level GLL. According to an embodiment, the luminance factors LF may include at least one selected from the grayscale level GLL, the frame frequency FF, the on-duty ratio OD, the power voltages ELVDD and ELVSS, the bias voltage VB, and the initialization voltage VINT. Accordingly, the grayscale voltage GV for the display panel 200 may vary based on the grayscale level GLL, the frame frequency FF, the on-duty ratio OD, the power voltages ELVDD and ELVSS, or the initialization voltage VINT.

The representative display panel 10 may be a panel made before the display panel 200 is manufactured, and may be a panel for generating a pre-learning model (i.e., the representative panel model 10 shown in FIG. 4) for the transfer learning. The transfer learning will be described later in detail. The representative panel model 10 may receive the luminance factors LF, a target luminance TL in the luminance factors LF, and a target color coordinate TC in the luminance factors LF, and may output a grayscale voltage GV' for the representative panel.

The deep learning is a learning process for making the representative panel model 10, and an artificial neural network model may be trained according to an embodiment. When data is input to the artificial neural network model, output data may vary according to values of weights of hidden layer of the artificial neural network model. The deep learning may adjust the values of the weights so that the artificial neural network model outputs a desired target value. In an embodiment, for example, the target luminance TL and the target color coordinate TC corresponding to the luminance factors TL are set, and a first test voltage for displaying the target luminance TL and the target color coordinate TC may be measured while changing the data voltage applied to the representative display panel. The deep learning may use the luminance factors LF, the target luminance TL, and the target color coordinate TC as input values, and use the first test voltage as a target value. The artificial neural network model may be learned or trained by the deep learning. As a result, an embodiment of the method of FIG. 1 may use the trained artificial neural network model as the representative panel model 10 and determine the output value of the representative panel model 10 as the grayscale voltage GV' for the representative display panel 10. The grayscale voltage will be described later.

In an embodiment, the method of FIG. 1 may include generating a panel model 20 by performing the transfer learning based on the representative panel model 10 and the display panel 200 (S120). The transfer learning may be use the pre-learning model made in a specific environment to train artificial neural networks in other environments. The transfer learning may reuse a part of a hidden layer of the pre-learning model and employ some of weights of the pre-learning model as it is. Since the transfer learning trains the artificial neural network model using the pre-learning model, the transfer learning may be performed with a relatively small amount of data. Accordingly, by performing the transfer learning using the representative panel model 10 as a pre-learning model, the transfer learning may reduce data used to generate the panel model 20. In an embodiment, for example, the target luminance TL and the target color coordinate TC corresponding to the luminance factors TL are set, and a second test voltage for displaying the target luminance TL and the target color coordinate TC may be measured while changing the data voltage DV applied to the display panel 200. The first test voltage may be measured under more conditions of the luminance factors TL than the second test voltage. In an embodiment, for example, when the luminance factors TL include the grayscale level GLL, the first test voltage may include voltage values when the grayscale levels GLL are 10, 20, 30, 40, 50, 60, 70, 80, 90, 100, 110, 120, 130, 140, 150, 160, 170, 180, 190, 200, 210, 220, 230, 240, and 250 and the second test voltage may include voltage values when the grayscale levels GLL are 50, 100, 150, 200, and 250. When the second test voltage is measured, the transfer learning may be performed on the artificial neural network model. The transfer learning may take (or use) the luminance factors TL, the target luminance TL, and the target color coordinates TC as input values, take the second test voltage as the target value, use a part of the hidden layers of the pre-learning model (i.e., the representative panel model 10), and employ the weights of the pre-learning model (i.e., the representative panel model 10). As a result, the artificial neural network model on which the transfer learning is completed may be used as the panel model 20, and an output value of the panel model 20 may be determined as the grayscale voltage GV for the display panel 200. The grayscale voltage will be described later.

In an embodiment, the method of FIG. 1 may include determining a grayscale voltage GV for the display panel 200 based on the panel model 20 (S130). The grayscale voltage GV may mean a voltage value of the data voltage DV according to the luminance factors LF to display an image on the display panel 200 based on the input image data IMG. In an embodiment, for example, where the grayscale voltage is 1 volt (V) when the luminance factors LF include only the grayscale level GLL and the on-duty ratio OD, the grayscale level GLL may be 10, and the on-duty ratio OD may be 0.9. In this case, when the grayscale level GLL of the input image data IMG is 10 and the on-duty ratio OD is 0.9, the voltage value of the data voltage DV may be 1 V. As such, the grayscale voltage GV may be determined so that the display device 1000 has a specific gamma characteristic. The gamma characteristic indicates a correlation between the grayscale level GLL and the luminance. The luminance may be affected not only by grayscale level GLL but also by other factors (e.g., the frame frequency FF, the on-duty ratio OD, the power voltages ELVDD and ELVSS, and the initialization voltage VINT). Therefore, the display device 1000 may more accurately have a specific gamma characteristic by determining the grayscale voltage GV in consideration of the other factors.

In an embodiment, the method of FIG. 1 may further include storing the information IGV on the gray scale voltage. According to an embodiment, the method of FIG. 1 may store the information IGV on the grayscale voltage in the memory device 600. According to an embodiment, the information IGV on the grayscale voltage may include a voltage value of the grayscale voltage GV at a specific value of the luminance factors LF. In an embodiment, for example, the information IGV on the grayscale voltage includes only the voltage value of the grayscale voltage GV when each of the luminance factors LF has reference values, and a voltage value of the grayscale voltage GV when each of the luminance factors LF has not the reference values may be obtained through interpolation.

Figure 6:
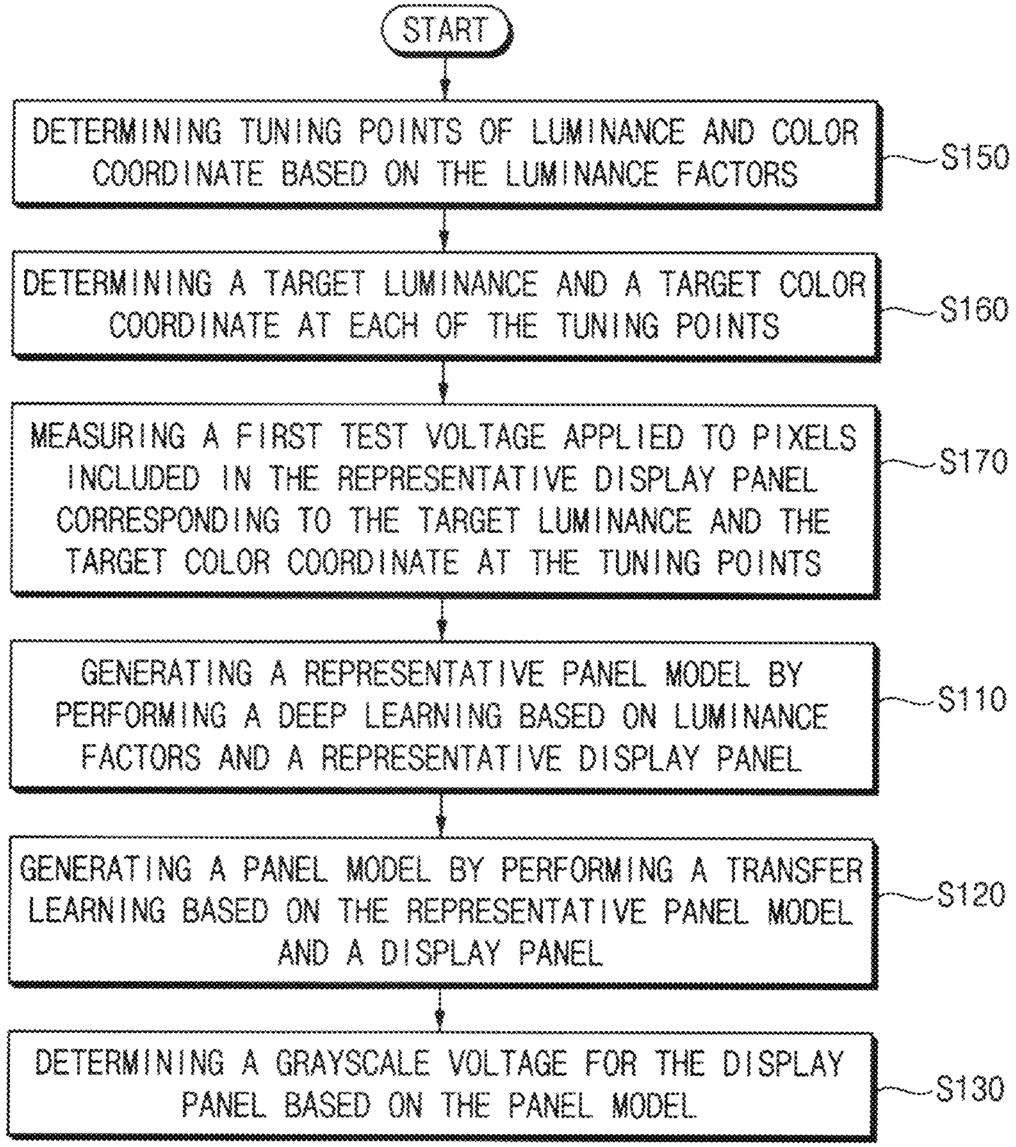
FIG. 6 is a flowchart illustrating a method of correcting gamma according to embodiments of the invention.
Figure 7:
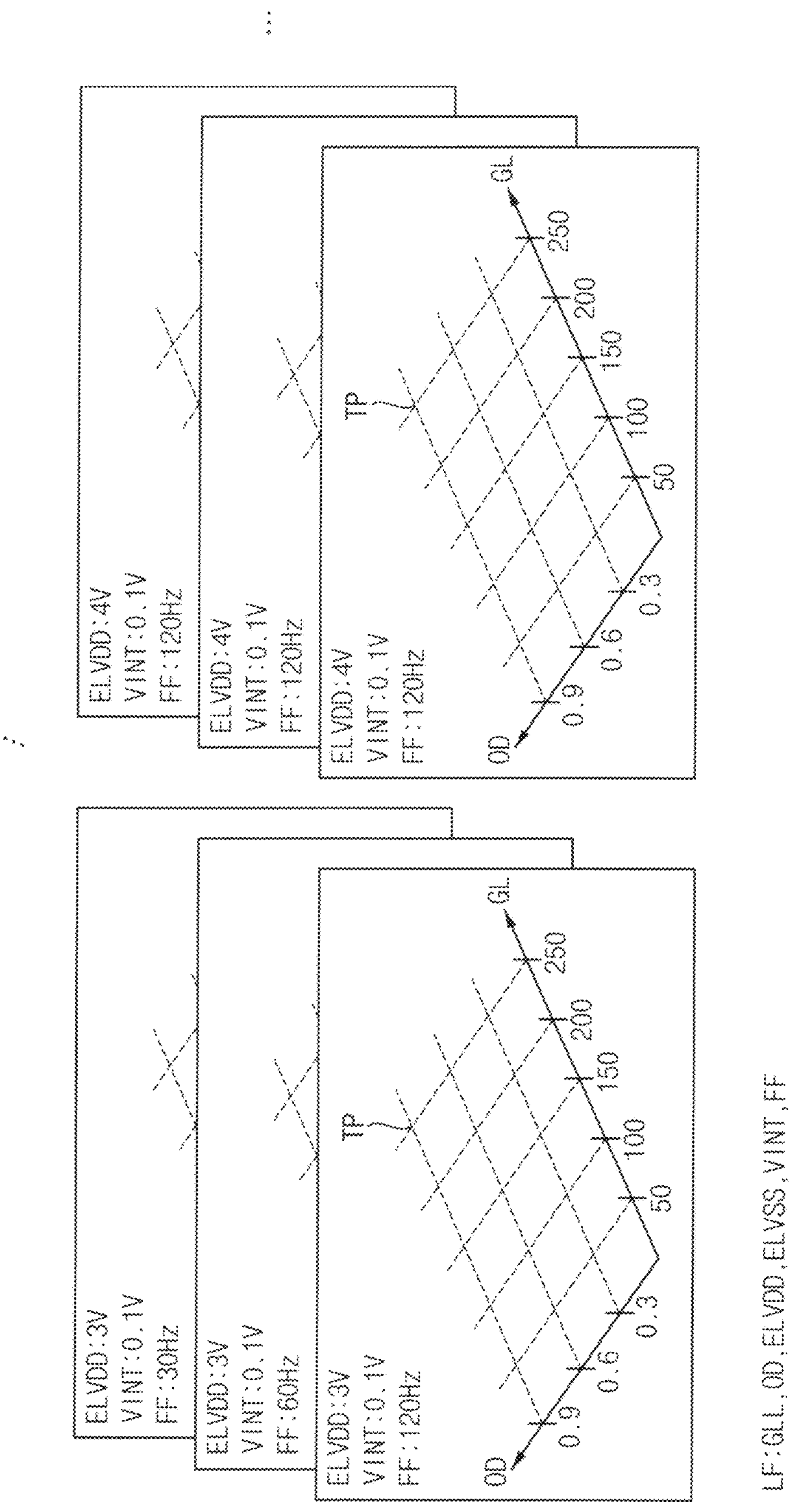
FIG. 7 is a diagram illustrating an embodiment of tuning points of the method of FIG. 6.
Figure 8:
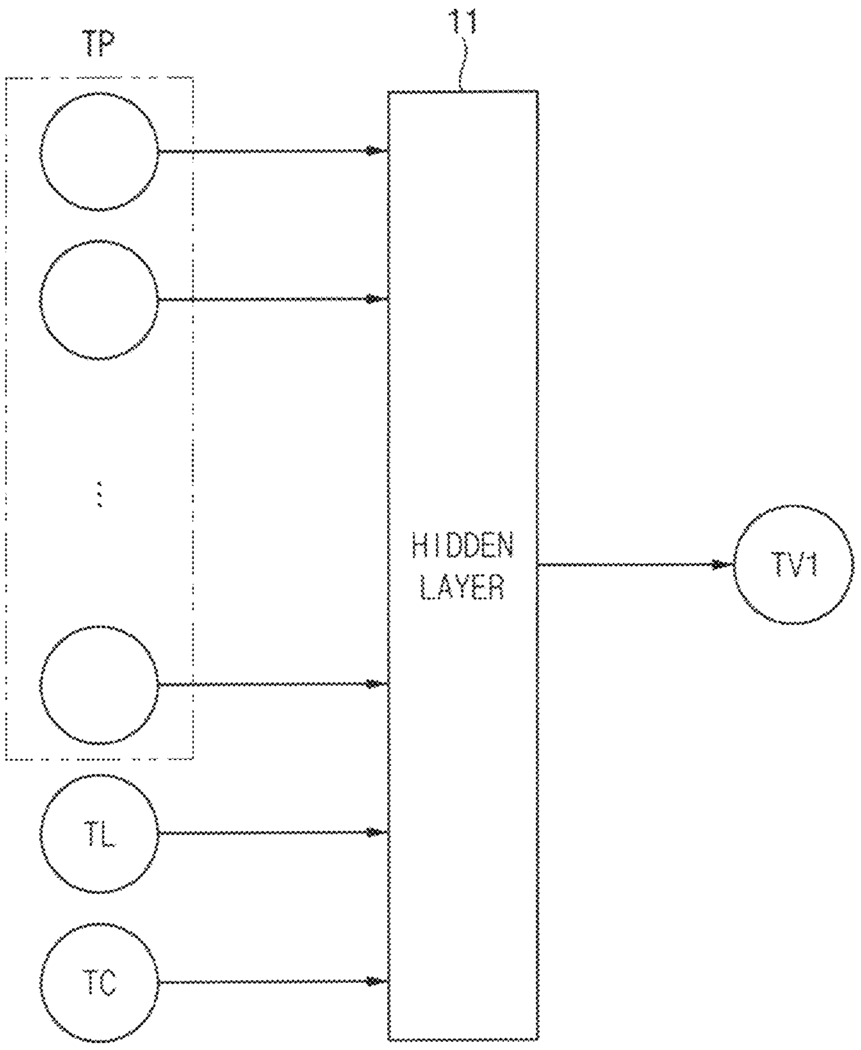
FIG. 8 is a diagram illustrating an embodiment in which the method of FIG. 6 performs a deep learning.

FIG. 6 is a flowchart illustrating a method of correcting gamma according to embodiments of the invention, FIG. 7 is a diagram illustrating an embodiment of tuning points TP of the method of FIG. 6, FIG. 8 is a diagram illustrating an embodiment in which the method of FIG. 6 performs the deep learning. FIG. 7 shows an embodiment where the tuning points TP include the grayscale level GLL, the frame frequency FF, the on-duty ratio OD, the first power voltage ELVDD, and the initialization voltage VINT.

The method of FIGS. 6 to 8 is substantially the same as the method of FIGS. 1 to 5 except for generating the representative panel model 10. The same or like elements shown in FIGS. 6 to 8 have been labeled with the same reference characters as used above to describe the embodiment of the method of correcting gamma shown in FIGS. 1 to 5, and any repetitive detailed description thereof will hereinafter be omitted or simplified.

Referring to FIGS. 6 to 8, an embodiment of the method correcting gamma may include determining the tuning points TP of the luminance and the color coordinate based on the luminance factors LF (S150), determining the target luminance TL and the target color coordinate TC at each of the tuning points TP (S160), measuring the first test voltage TV1 applied to pixels included in the representative display panel corresponding to the target luminance TL and the target color coordinate TC at the tuning points TP (S170), generating the representative panel model 10 by performing the deep learning based on the luminance factors LF and the representative display panel (S110), generating a panel model 20 by performing the transfer learning based on the representative panel model 10 and the display panel 200

(S120), and determining a grayscale voltage GV for the display panel 200 based on the panel model 20 (S130). According to an embodiment, the method of FIG. 6 may further include storing the information IGV on the grayscale voltage. In an embodiment, for example, the method of FIG. 6 may store the information IGV on the grayscale voltage on the memory device 600.

In an embodiment, the method of FIG. 6 may include determining the tuning points TP of the luminance and the color coordinate based on the luminance factors LF (S150). The method of FIG. 6 may include determining reference values of the respective luminance factors LF and determining the tuning points TP based on the reference values. The tuning points TP may be states of the luminance factors LF in which the first test voltage TV1 is measured. Since measuring the first test voltage TV1 corresponding to all values of the luminance factors LF generates too much data, the method of FIG. 6 may determine the reference values of the respective luminance factors LF and the tuning points TP may be determined based on the reference values of the respective luminance factors LF. The tuning points may be intersections of the reference values of the respective luminance factors LF. The number of the tuning points TP may be a product of respective numbers of the reference values of the respective luminance factors LF.

In an embodiment, for example, where the number of the reference values of the grayscale level GLL are 5 (e.g., 50, 100, 150, 200, and 250), the number of the reference values of the on-duty ratio OD are 3 (e.g., 0.3, 0.6, and 0.9), the number of the reference values of the first power voltage ELVDD are 3 (e.g., 3 V, 4 V, and 5 V), the number of the reference values of the initialization voltage VINT are 3 (e.g., 0.1V, 0.2 V, and 0.3 V), and the number of the reference values of the frame frequency FF are 3 (e.g., 30 hertz (Hz), 60 Hz, and 120 Hz). A state in which the grayscale level GLL is 50, the on-duty ratio OD is 0.3, the first power voltage ELVDD is 3 V, and the initialization voltage VINT is 0.1 V may become one tuning point TP. The number of the tuning points TP may be 405 (i.e., 5×3×3×3×3=405), which is a product of the respective numbers of the reference values of the respective luminance factors LF. The reference values of each of the luminance factors LF may be determined between a maximum value and a minimum value among values that may come out while the display panel 200 is being driven.

In an embodiment, the method of FIG. 6 may include determining the target luminance TL and the target color coordinate TC at each of the tuning points TP (S160), measuring the first test voltage TV1 applied to pixels included in the representative display panel corresponding to the target luminance TL and the target color coordinate TC at the tuning points TP (S170), and generating a representative panel model by performing the deep learning based on luminance factors LF and a representative display panel 10 (S110). The deep learning may be performed based on the tuning points TP, the target luminance TL, the target color coordinate TC, and the first test voltage TV1. In an embodiment, for example, the target luminance TL and the target color coordinate TC corresponding to the luminance factors TL are set, and the first test voltage TV1 for displaying the target luminance TL and the target color coordinate TC may be measured while changing the data voltage applied to the representative display panel. The deep learning may use the tuning points TP, the target luminance TL, and the target color coordinate TC as input values, and use the first test voltage as a target value. The artificial neural network model may be trained by the deep learning. Accordingly, when the tuning points TP, target luminance TL, and target color coordinates TC are input to the artificial neural network model, the artificial neural network model may output the first test voltage TV1. As a result, the method of FIG. 6 may use the trained artificial neural network model as the representative panel model 10, and determine the output value of the representative panel model 10 as the grayscale voltage GV' for the representative display panel.

Figure 9:
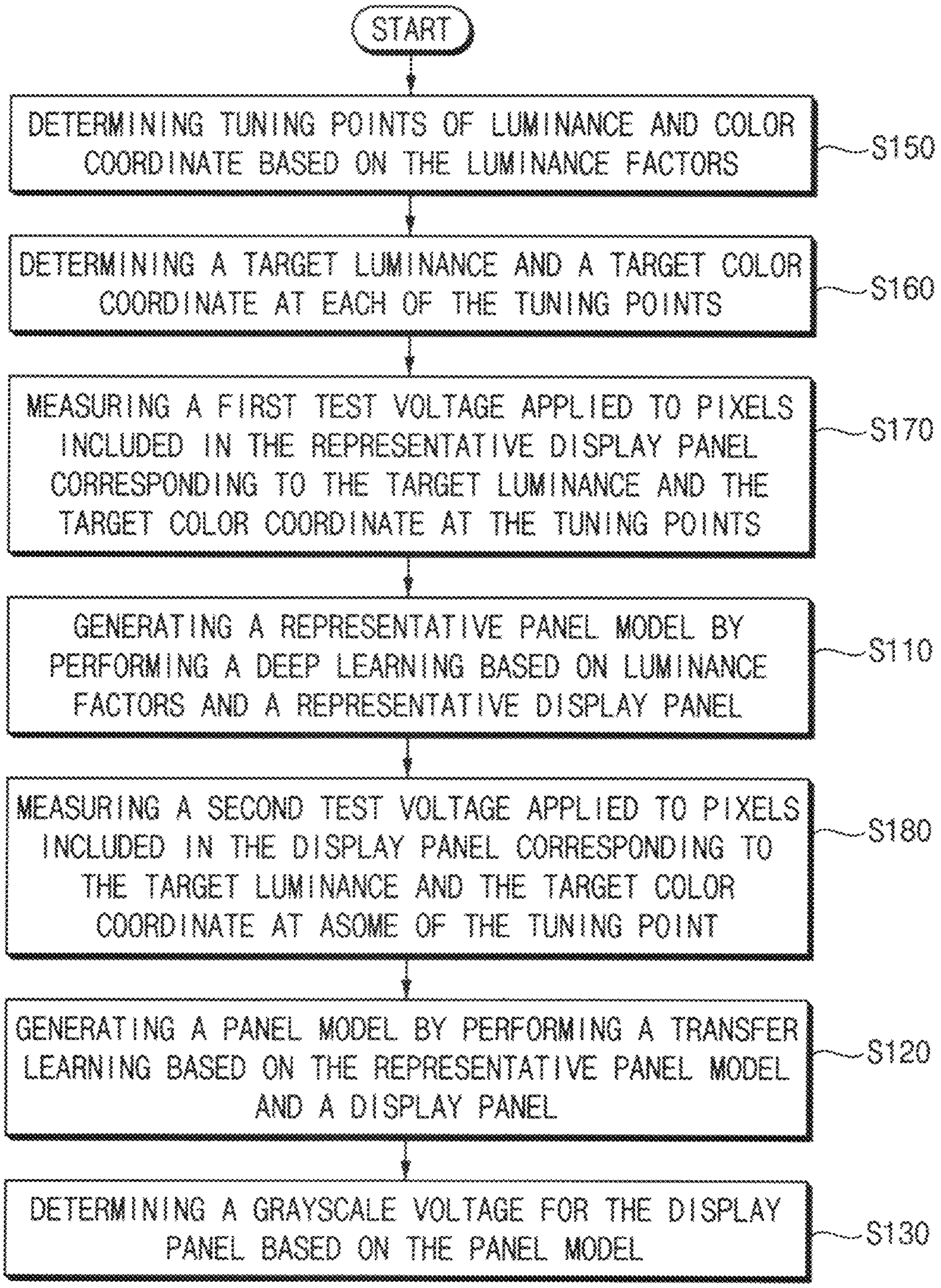
FIG. 9 is a flowchart illustrating a method of correcting gamma according to embodiments of the invention.

FIG. 9 is a flowchart illustrating a method of correcting gamma according to embodiments of the invention.

The method of FIG. 9 is substantially the same as the method of FIGS. 6 to 8 except for measuring the second test voltage. The same or like elements shown in FIG. 9 have been labeled with the same reference characters as used above to describe the embodiment of the method of correcting gamma shown in FIGS. 6 to 8, and any repetitive detailed description thereof will hereinafter be omitted or simplified.

Referring to FIG. 9, an embodiment of the method of correcting gamma may include determining the tuning points TP of the luminance and the color coordinate based on the luminance factors LF (S150), determining the target luminance TL and the target color coordinate TC at each of the tuning points TP (S160), measuring the first test voltage TV1 applied to pixels included in the representative display panel corresponding to the target luminance TL and the target color coordinate TC at the tuning points TP (S170), generating the representative panel model 10 by performing the deep learning based on the luminance factors LF and the representative display panel (S110), measuring the second test voltage applied to the pixels P included in the display panel 200 corresponding to the target luminance TL and the target color coordinate TC at a some of the tuning points TP (S180), generating the panel model 20 by performing the transfer learning based on the representative panel model 10 and the display panel 200 (S120), and determining the grayscale voltage GV for the display panel 200 based on the panel model 20 (S130). According to an embodiment, the method of FIG. 9 may further include storing the information IGV on the grayscale voltage. In an embodiment, for example, the method of FIG. 9 may store the information IGV on the grayscale voltage in the memory device 600.

In an embodiment, the method of FIG. 9 may include measuring the second test voltage applied to the pixels P included in the display panel 200 corresponding to the target luminance TL and the target color coordinate TC at a some of the tuning points TP (S180) and generating the panel model 20 by performing the transfer learning based on the representative panel model 10 and the display panel 200 (S120). The transfer learning may be performed based on the some of the tuning points TP, the target luminance TL at the some of the tuning points TP, the target color coordinate TC at the some of the tuning points TP, the second test voltage, and the representative panel model 10. Since the transfer learning trains the artificial neural network model using the pre-learning model, the transfer learning may be performed with a relatively small amount of data. Therefore, since the transfer learning may be performed using the representative panel model 10 as the pre-learning model, the transfer learning may be performed based on the second test voltage measured at some of the tuning points TP. The first test voltage may be measured under more conditions of the luminance factors TL than the second test voltage. In an embodiment, for example, the first test voltage TV1 may be measured at all of the tuning points TP, and the second test voltage may be measured at some of the tuning points TP. When the second test voltage is measured, the transfer learning may be performed on the artificial neural network model. The transfer learning may take some of the tuning points, the target luminance TL at the some of the tuning points TP, and the target color coordinates TC at the some of the tuning points TP as input values, take the second test voltage at the some of the tuning points TP as the target value, use a part of the hidden layers 11 of the pre-learning model (i.e., the representative panel model 10), and employ the weights of the pre-learning model (i.e., the representative panel model 10). As a result, the artificial neural network model on which the transfer learning is completed may be used as the panel model 20, and an output value of the panel model 20 may be determined as the grayscale voltage GV for the display panel 200.

Figure 10:
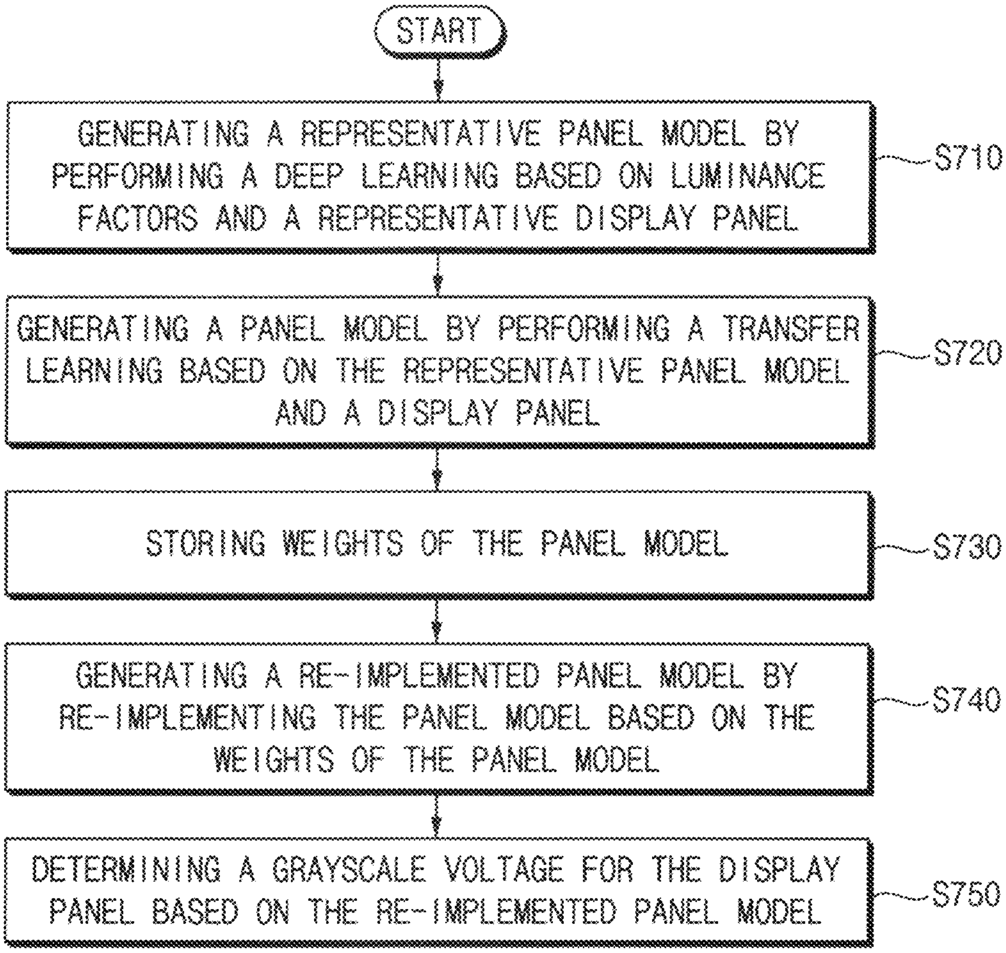
FIG. 10 is a flowchart illustrating a method of correcting gamma according to embodiments of the invention.
Figure 11:
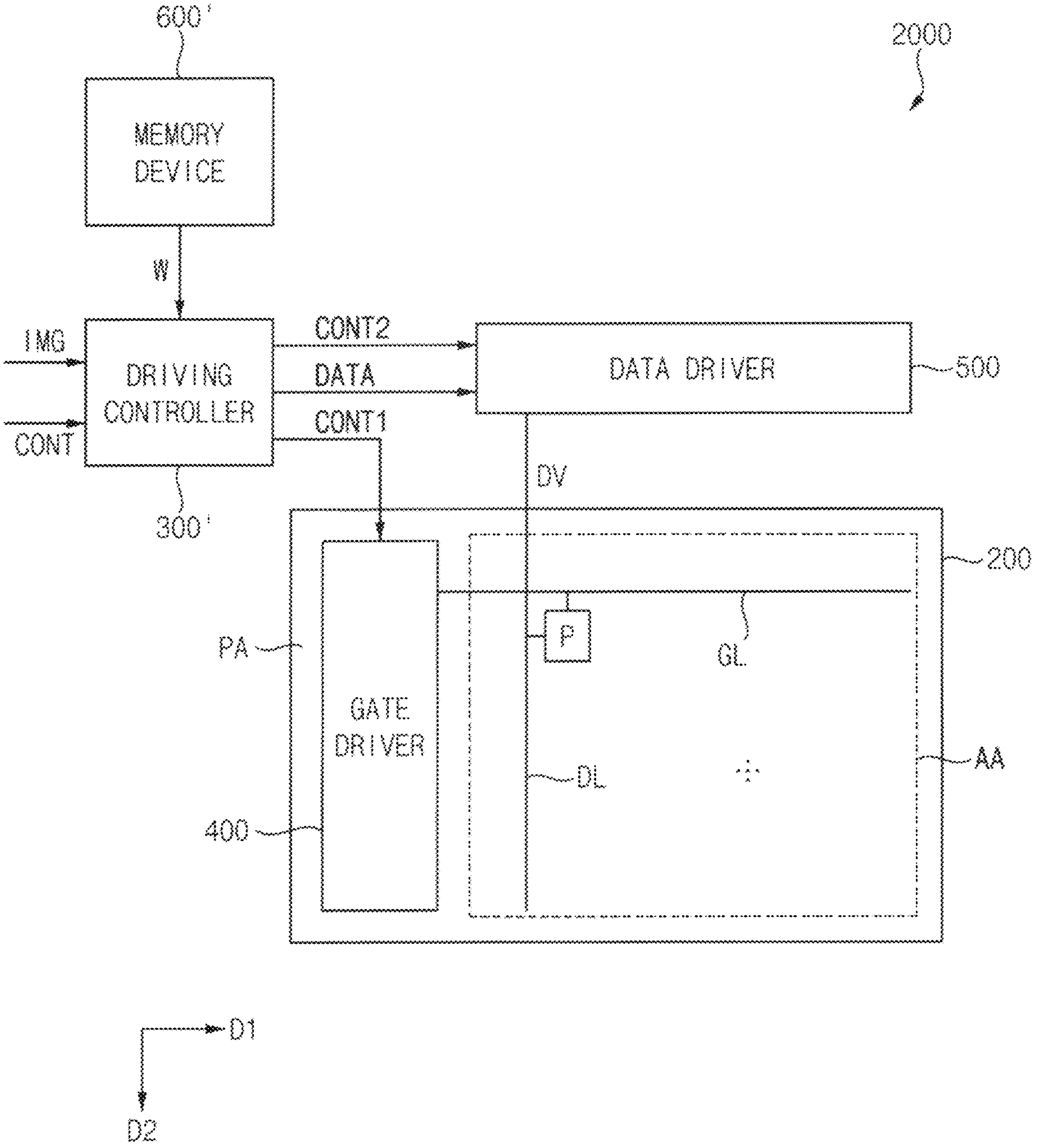
FIG. 11 is a block diagram illustrating an embodiment of a display device employing the method of FIG. 10.

FIG. 10 is a flowchart illustrating a method of correcting gamma according to embodiments of the invention, and FIG. 11 is a block diagram illustrating an embodiment of a display device 2000 employing the method of FIG. 10.

The method of FIGS. 10 and 11 is substantially the same as the method of FIG. 1 except for operations after generating the panel model 20. The same or like elements shown in FIGS. 10 and 11 have been labeled with the same reference characters as used above to describe the embodiments of the method of correcting gamma shown in FIGS. 1 to 9, and any repetitive detailed description thereof will hereinafter be omitted or simplified.

Referring to FIGS. 10 and 11, an embodiment of the display device 2000 may include a display panel 200, a driving controller 300, a gate driver 400, a data driver 500', and memory device 600'.

The display panel 200 may include pixels P. The gate driver 400 may apply gate signals GW(j), GC(j), GI(j), and GB(j) to the pixels P. The data driver 500 may apply the data voltage DV to the pixels P. The driving controller 300' may control the gate driver 400 and the data driver 500'.

The driving controller 300' may generate the first control signal CONT1, the second control signal CONT2, and the data signal DATA based on the input image data IMG, the weights W of the panel model 20, and the input control signal CONT. The driving controller 300' may receive the input image data IMG and the weights W of the panel model 10 and generate the data signal DATA. The driving controller 300' may output the data signal DATA to the data driver 500'.

The memory device 600' may store the weights W of the panel model 20. The driving controller 300' may receive the weights W of the panel model 20 from the memory device 600', generate a re-implemented panel model by re-implementing the panel model 20 based on the weights W of the panel model 20, and determine the grayscale voltage GV based on the re-implemented panel model. Storing the weights W of the panel model 20 in the memory device 600' may reduce the amount of data to be stored compared to storing the information on grayscale voltage for all values of the luminance factors LF. In an embodiment, the re-implemented panel model may be generated during driving of the display panel 200.

An embodiment of the method of correcting gamma, as shown in FIG. 10, may include generating the representative panel model 10 by performing the deep learning based on the luminance factors LF and the representative display panel (S710), generating the panel model 20 by performing the transfer learning based on the representative panel model 10 and the display panel 200 (S720), storing the weights W of the panel model 20 (S730), generating the re-implemented panel model by re-implementing the panel model 20 based on the weights W of the panel model 20 (S740), and determining the grayscale voltage GV for the display panel 200 based on the re-implemented panel model (S750). According to an embodiment, the weights of the panel model 20 may be stored in the memory device 600'.

In an embodiment, the method of FIG. 10 may include storing the weights W of the panel model 20 (S730), generating the re-implemented panel model by re-implementing the panel model 20 based on the weights W of the panel model 20 (S740), and determining the grayscale voltage GV for the display panel 200 based on the re-implemented panel model (S750). When data is input to the artificial neural network model, output data may vary based on values of weights of hidden layer of the artificial neural network model. The deep learning may adjust the values of the weights so that the artificial neural network model outputs a desired target value. Accordingly, by applying values of the weights W of the panel model 20 to the artificial neural network model, the panel model 20 may be re-implemented. In an embodiment, for example, since the re-implemented panel model has the same weights W as the panel model 20, the same output value may be output for the same input value. According to an embodiment, the display device 2000 may store the weights W of the panel model 20 in the memory device 600' and re-implement the panel model 20 through the driving controller 300'.

Figure 12:
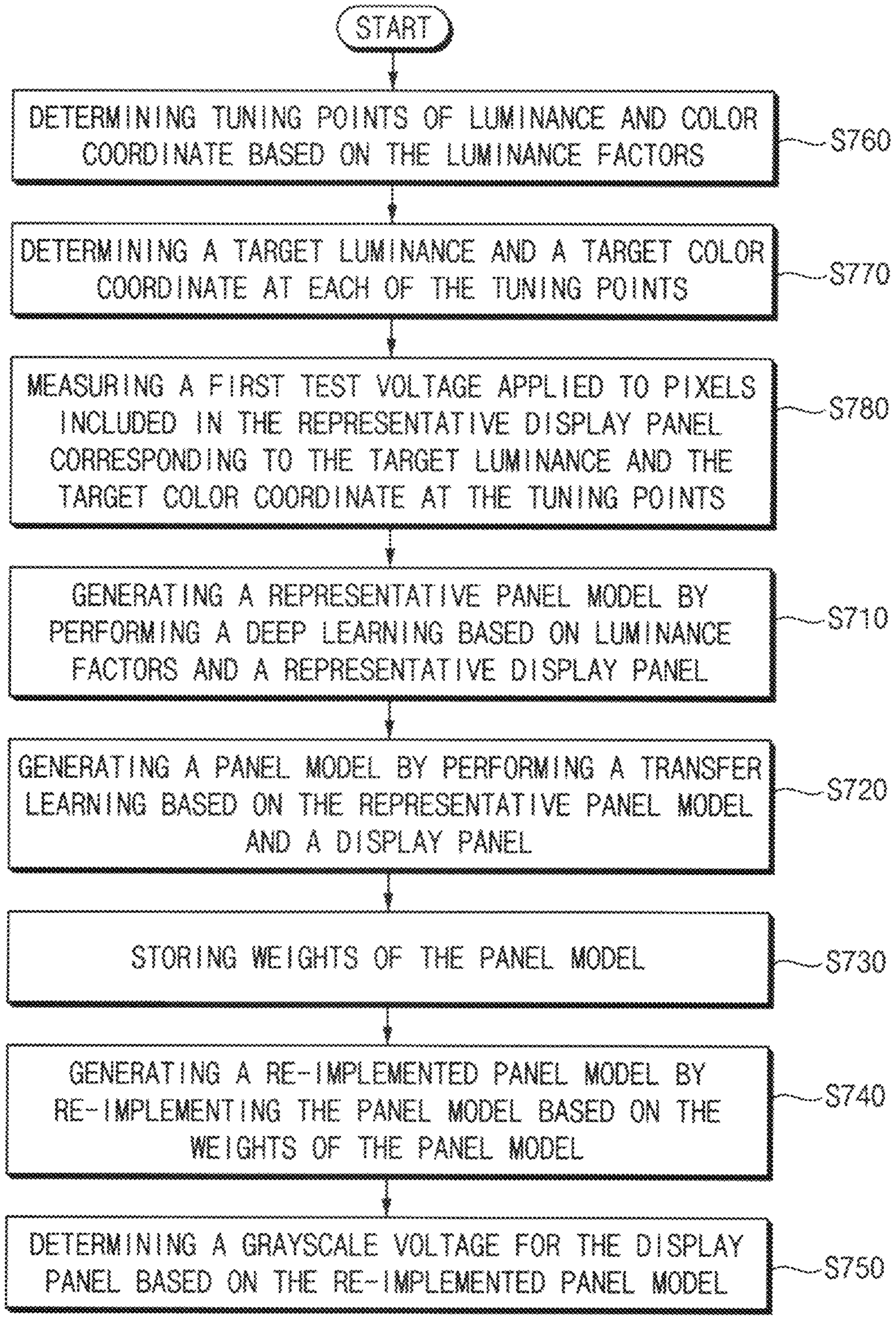
FIG. 12 is a flowchart illustrating a method of correcting gamma according to embodiments of the invention.

FIG. 12 is a flowchart illustrating a method of correcting gamma according to embodiments of the invention.

The method of FIG. 12 is substantially the same as the method of FIGS. 10 and 11 except for operations before generating the representative panel model 10. The same or like elements shown in FIG. 12 have been labeled with the same reference characters as used above to describe the embodiment of the method of correcting gamma shown in FIGS. 10 and 11, and any repetitive detailed description thereof will hereinafter be omitted or simplified.

Referring to FIG. 12, an embodiment of the method of corresponding gamma may include determining the tuning points TP of the luminance and the color coordinate based on the luminance factors LF (S760), determining the target luminance TL and the target color coordinate TC at each of the tuning points TP (S770), measuring the first test voltage TV1 applied to pixels included in the representative display panel corresponding to the target luminance TL and the target color coordinate TC at the tuning points TP (S780), generating the representative panel model 10 by performing the deep learning based on the luminance factors LF and the representative display panel (S710), generating the panel model 20 by performing the transfer learning based on the representative panel model 10 and the display panel 200 (S720), storing the weights W of the panel model 20 (S730), generating the re-implemented panel model by re-implementing the panel model 20 based on the weights W of the panel model 20 (S740), and determining the grayscale voltage GV for the display panel 200 based on the re-implemented panel model (S750). According to an embodiment, the weights of the panel model 20 may be stored in the memory device 600'.

In an embodiment, the method of FIG. 12 may include determining the tuning points TP of the luminance and the color coordinate based on the luminance factors LF (S760). The method of FIG. 12 may include determining reference values of the respective luminance factors LF and determining the tuning points TP based on the reference values. The tuning points TP may be states of the luminance factors LF in which the first test voltage TV1 is measured. Since measuring the first test voltage TV1 corresponding to all values of the luminance factors LF generates too much data, the method of FIG. 12 may determine the reference values of the respective luminance factors LF and the tuning points TP may be determined based on the reference values of the respective luminance factors LF. The tuning points may be intersections of the reference values of the respective luminance factors LF. The number of the tuning points TP may be a product of respective numbers of the reference values of the respective luminance factors LF.

In an embodiment, for example, where the number of the reference values of the grayscale level GLL are 5 (e.g., 50, 100, 150, 200, and 250), the number of the reference values of the on-duty ratio OD are 3 (e.g., 0.3, 0.6, and 0.9), the number of the reference values of the first power voltage ELVDD are 3 (e.g., 3 V, 4 V, and 5 V), the number of the reference values of the initialization voltage VINT are 3 (e.g., 0.1 V, 0.2 V, and 0.3 V), and the number of the reference values of the frame frequency FF are 3 (e.g., 30 Hz, 60 Hz, and 120 Hz). A state in which the grayscale level GLL is 50, the on-duty ratio OD is 0.3, the first power voltage ELVDD is 3 V, and the initialization voltage VINT is 0.1 V may become one tuning point TP. The number of the tuning points TP may be 405 (i.e., 5×3×3×3×3=405), which is a product of the respective numbers of the reference values of the respective luminance factors LF. The reference values of each of the luminance factors LF may be determined between a maximum value and a minimum value among values that may come out while the display panel 200 is being driven.

In an embodiment, the method of FIG. 12 may include determining the target luminance TL and the target color coordinate TC at each of the tuning points TP (S770), measuring the first test voltage TV1 applied to pixels included in the representative display panel corresponding to the target luminance TL and the target color coordinate TC at the tuning points TP (S780), and generating a representative panel model by performing the deep learning based on luminance factors LF and a representative display panel 10 (S710). The deep learning may be performed based on the tuning points TP, the target luminance TL, the target color coordinate TC, and the first test voltage TV1. In an embodiment, for example, the target luminance TL and the target color coordinate TC according to the luminance factors TL are set, and the first test voltage TV1 for displaying the target luminance TL and the target color coordinate TC may be measured while changing the data voltage applied to the representative display panel. The deep learning may use the tuning points TP, the target luminance TL, and the target color coordinate TC as input values, and use the first test voltage as a target value. The artificial neural network model may be trained by the deep learning. Accordingly, when the tuning points TP, target luminance TL, and target color coordinates TC are input to the artificial neural network model, the artificial neural network model may output the first test voltage TV1. As a result, the method of FIG. 12 may use the trained artificial neural network model as the representative panel model 10, and determine the output value of the representative panel model 10 as the grayscale voltage GV' for the representative display panel.

Figure 13:
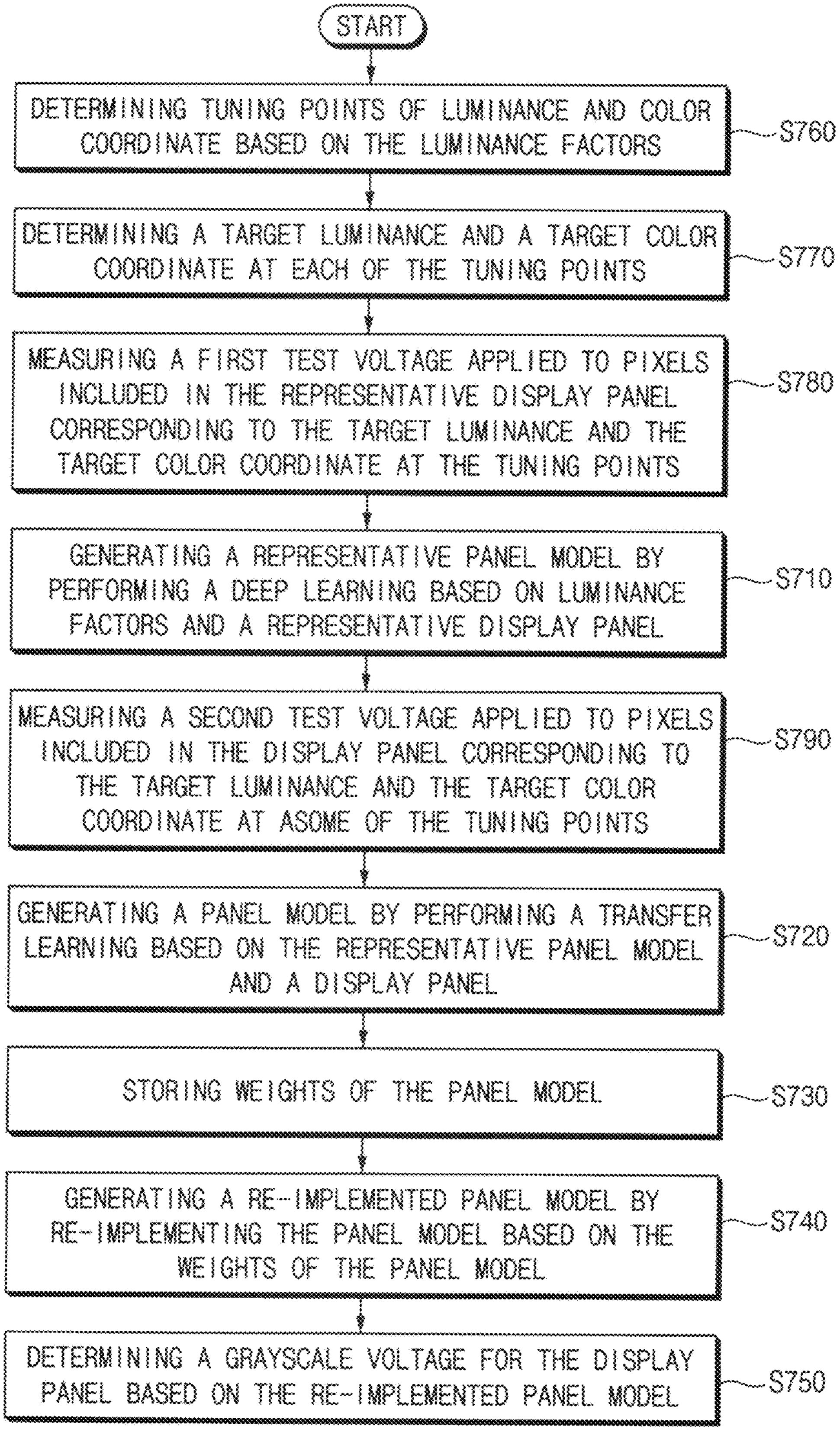
FIG. 13 is a flowchart illustrating a method of correcting gamma according to embodiments of the invention.

FIG. 13 is a flowchart illustrating a method of correcting gamma according to embodiments of the invention.

The method according to the embodiment is substantially the same as the method of FIG. 12 except for measuring the second test voltage. The same or like elements shown in FIG. 13 have been labeled with the same reference characters as used above to describe the embodiment of the method of correcting gamma shown in FIG. 12, and any repetitive detailed description thereof will hereinafter be omitted or simplified.

Referring to FIG. 13, an embodiment of the method of correcting gamma may include determining the tuning points TP of the luminance and the color coordinate based on the luminance factors LF (S760), determining the target luminance TL and the target color coordinate TC at each of the tuning points TP (S770), measuring the first test voltage TV1 applied to pixels included in the representative display panel corresponding to the target luminance TL and the target color coordinate TC at the tuning points TP (S780), generating the representative panel model 10 by performing the deep learning based on the luminance factors LF and the representative display panel (S710), measuring the second test voltage applied to the pixels P included in the display panel 200 corresponding to the target luminance TL and the target color coordinate TC at a some of the tuning points TP (S790), generating the panel model 20 by performing the transfer learning based on the representative panel model 10 and the display panel 200 (S720), storing the weights W of the panel model 20 (S730), generating the re-implemented panel model by re-implementing the panel model 20 based on the weights W of the panel model 20 (S740), and determining the grayscale voltage GV for the display panel 200 based on the re-implemented panel model (S750). According to an embodiment, the weights of the panel model 20 may be stored in the memory device 600'.

In an embodiment, the method of FIG. 13 may include measuring the second test voltage applied to the pixels P included in the display panel 200 corresponding to the target luminance TL and the target color coordinate TC at a some of the tuning points TP (S790) and generating the panel model 20 by performing the transfer learning based on the representative panel model 10 and the display panel 200 (S720). The transfer learning may be performed based on the some of the tuning points TP, the target luminance TL at the some of the tuning points TP, the target color coordinate TC at the some of the tuning points TP, the second test voltage, and the representative panel model 10. Since the transfer learning trains the artificial neural network model using the pre-learning model, the transfer learning may be performed with a relatively small amount of data. Therefore, since the transfer learning may be performed using the representative panel model 10 as the pre-learning model, the transfer learning may be performed based on the second test voltage measured at some of the tuning points TP. The first test voltage may be measured under more conditions of the luminance factors TL than the second test voltage. In an embodiment, for example, the first test voltage TV1 may be measured at all of the tuning points TP, and the second test voltage may be measured at some of the tuning points TP. When the second test voltage is measured, the transfer learning may be performed on the artificial neural network model. The transfer learning may take some of the tuning points, the target luminance TL at the some of the tuning points TP, and the target color coordinates TC at the some of the tuning points TP as input values, take the second test voltage at the some of the tuning points TP as the target value, use a part of the hidden layers of the pre-learning model (i.e., the representative panel model 10), and employ the weights of the pre-learning model (i.e., the representative panel model 10). As a result, the artificial neural network model on which the transfer learning is completed may be used as the panel model 20, and an output value of the panel model 20 may be determined as the grayscale voltage GV for the display panel 200.

The inventions may be applied to any electronic device including the display device. In an embodiment, for example, the inventions may be applied to a television ("TV"), a digital TV, a three-dimensional ("3D") TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of correcting gamma of a display panel, the method comprising:

generating a representative panel model by performing a deep learning based on luminance factors and a representative display panel, which is manufactured prior to manufacturing the display panel;

generating a panel model by performing a transfer learning based on the representative panel model and the display panel; and determining a grayscale voltage for the display panel based on the panel model, wherein the representative panel model is a pre-learning model generated based on the representative display panel in a specific environment, and wherein the transfer learning trains an artificial neural network to generate the panel model in another environment by reusing a part of a hidden layer of the pre-learning model generated in the specific environment and employing at least one selected from weights of the pre-learning model generated in the specific environment as it is.

2. The method of claim 1, wherein the luminance factors include a grayscale level, and the luminance factors further include at least one selected from a frame frequency, an on-duty ratio, a power supply voltage, and an initialization voltage.

3. The method of claim 1, further comprising:

storing information on the grayscale voltage.

4. The method of claim 1, further comprising:

determining tuning points of luminance and color coordinate based on the luminance factors;

determining a target luminance and a target color coordinate at each of the tuning points; and measuring a first test voltage applied to pixels included in the representative display panel corresponding to the target luminance and the target color coordinate at the tuning points, wherein the deep learning is performed based on the tuning points, the target luminance, the target color coordinate, and the first test voltage.

5. The method of claim 4, wherein the deep learning uses the tuning points, the target luminance, and the target color coordinate as input values, and the deep learning uses the first test voltage as a target value.

6. The method of claim 4, wherein determining the tuning points includes:

determining reference values of the respective luminance factors; and determining the tuning points based on the reference values.

7. The method of claim 6, wherein a number of the tuning points is a product of respective numbers of the reference values of the respective luminance factors.

8. The method of claim 4, further comprising:

measuring a second test voltage applied to pixels included in the display panel corresponding to the target luminance and the target color coordinate at a some of the tuning points, wherein the transfer learning is performed based on the some of the tuning points, the target luminance at the some of the tuning points, the target color coordinate at the some of the tuning points, the second test voltage, and the representative panel model.

9. The method of claim 1, wherein the panel model is generated in a cell process, and the representative panel model is generated before the cell process.

10. A method of correcting gamma of a display panel, the method comprising:

generating a representative panel model by performing a deep learning based on luminance factors and a representative display panel, which is manufactured prior to manufacturing the display panel;

generating a panel model by performing a transfer learning based on the representative panel model and the display panel;

storing weights of the panel model;

generating a re-implemented panel model by re-implementing the panel model based on the weights of the panel model; and determining a grayscale voltage for the display panel based on the re-implemented panel model, wherein the representative panel model is a pre-learning model generated based on the representative display panel in a specific environment, and wherein the transfer learning trains an artificial neural network to generate the panel model in another environment by reusing a part of a hidden layer of the pre-learning model generated in the specific environment and employing at least one selected from weights of the pre-learning model generated in the specific environment as it is.

11. The method of claim 10, wherein the luminance factors include a grayscale level, and the luminance factors further include at least one selected from a frame frequency, an on-duty ratio, a power supply voltage, and an initialization voltage.

12. The method of claim 10, further comprising:

determining tuning points of luminance and color coordinate based on the luminance factors;

determining a target luminance and a target color coordinate at each of the tuning points; and measuring a first test voltage applied to pixels included in the representative display panel corresponding to the target luminance and the target color coordinate at the tuning points, wherein the deep learning is performed based on the tuning points, the target luminance, the target color coordinate, and the first test voltage.

13. The method of claim 12, wherein the deep learning uses the tuning points, the target luminance, and the target color coordinate as input values, and the deep learning uses the first test voltage as a target value.

14. The method of claim 12, wherein determining the tuning points includes:

determining reference values of the respective luminance factors; and determining the tuning points based on the reference values.

15. The method of claim 12, wherein a number of the tuning points is a product of respective numbers of the reference values of the respective luminance factors.

16. The method of claim 12, further comprising:

measuring a second test voltage applied to pixels included in the display panel corresponding to the target luminance and the target color coordinate at some of the tuning points, wherein the transfer learning is performed based on the some of the tuning points, the target luminance at the some of the tuning points, the target color coordinate at the some of the tuning points, the second test voltage, and the representative panel model.

17. The method of claim 10, wherein the panel model is generated in a cell process, and the representative panel model is generated before the cell process.

18. The method of claim 17, wherein the re-implemented panel model is generated during driving of the display panel.

19. A display device comprising:

a display panel including pixels;

a gate driver which applies gate signals to the pixels;

a data driver which applies data voltages to the pixels;

a driving controller which controls the gate driver and the data driver; and a memory device which stores weights of a panel model, wherein the driving controller receives the weights of the panel model from the memory device, generates a re-implemented panel model by re-implementing the panel model based on the weights of the panel model, and determines a grayscale voltage for the display panel based on the re-implemented panel model, wherein the panel model is a model generated by performing a transfer learning in a cell process to match a representative panel model to characteristics of the display panel, wherein the representative panel model is a pre-learning model generated based on a representative display panel, which is manufactured prior to manufacturing the display panel, in a specific environment, wherein the transfer learning trains an artificial neural network to generate the panel model in another environment by reusing a part of a hidden layer of the pre-learning model generated in the specific environment and employing at least one selected from weights of the pre-learning model generated in the specific environment as it is, and wherein the re-implemented panel model outputs the grayscale voltage when luminance factors are input.

20. The display device of claim 19, wherein the luminance factors include a grayscale level, and the luminance factors further include at least one selected from a frame frequency, an on-duty ratio, a power supply voltage, and an initialization voltage.

* * * * *